J. L. Nicolai,

Egg-Beater,

Nº 23,814. Patented Apr. 26, 1859.

Witnesses:
James Gallagher

Inventor.
J. L. Nicolai

UNITED STATES PATENT OFFICE.

JOHN L. NICOLAI, OF CHICAGO, ILLINOIS, ASSIGNOR TO HIMSELF, S. E. KNOTT, AND R. F. FARRELL, OF SAME PLACE.

EGG-BEATER.

Specification of Letters Patent No. 23,814, dated April 26, 1859.

*To all whom it may concern:*

Be it known that I, J. L. NICOLAI, of Chicago, in the county of Cook and State of Illinois, have invented a new and Improved Egg-Beater; and I do hereby declare that the following is a full, clear, and exact description of the same, reference being had to the accompanying drawings, making part of this specification, in which—

Figure 1:
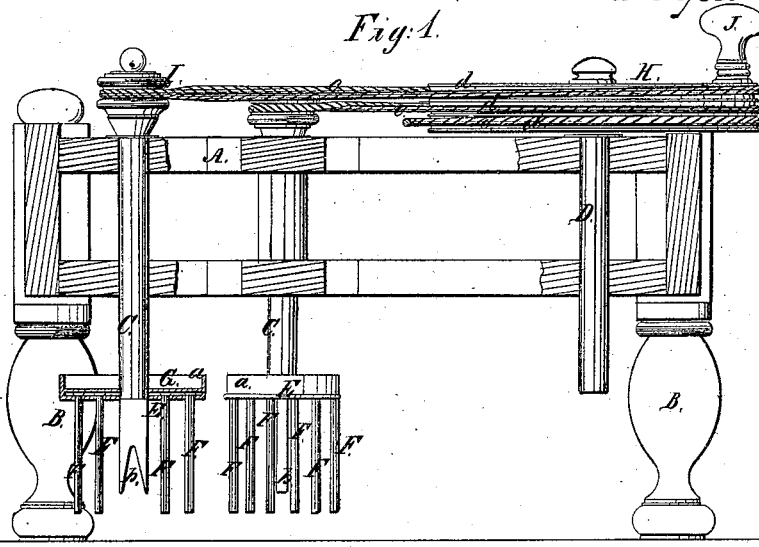
Figure 2:
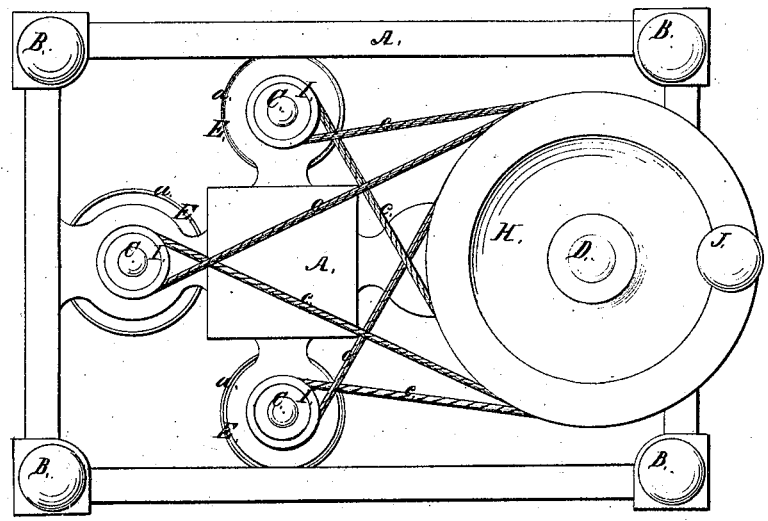

Figure 1 represents a vertical longitudinal section of an egg beater constructed according to my improvements, and Fig. 2 is a plan or top view of ditto.

Similar letters in the two views refer to corresponding parts.

This invention consists in arranging a series of fingered beaters in the same frame in such a manner that by revolving one wheel the white of the eggs and the yolk and eggs and sugar or other mixtures or substances contained in several different vessels can be exposed to the action of the beaters at one and the same time, and the construction of the fingered beaters is such that they insure a quick effect on a large quantity of eggs or any other substance to be acted on in a similar manner.

To enable those skilled in the art to fully understand, use, and construct my invention I will proceed to describe its construction and operation.

A is a frame constructed of wood or any other suitable material and of such a size as will be most convenient for the purpose, and this frame rests on legs B and it forms the bearings for a series of vertical arbors C and for the driving shaft D. Attached to the lower parts of the arbors C are the beaters C' which consist of disks E which may be constructed with flanges *a* so as to assume the shape of small round cups or boxes as clearly represented in Fig. 1 or they may be plain disks of sheet metal or any other substance which can be attached conveniently and permanently to the arbors C, and secured to these disks are the flexible fingers F, and a covering plate G is placed over the ends of the same to prevent them from slipping up. These fingers are constructed of some yielding material such as vulcanized india rubber or gutta-percha or any other suitable substance which is not perfectly rigid and which undergoes no chemical alteration by being brought in contact with the substances to be mixed by this action.

The number of these fingers depend upon the size of the disks and they ought to be made sufficiently thick so as to offer a certain resistance as they pass through the substance to be mixed or beaten. The ends of the arbors C extend a certain distance through the disks E and that part of the same below the disks is flattened out and it ends in a fork *b* which assists in mixing or beating.

The arbors C are rotated by means of endless belts *c* which extend around a wheel H which is rigidly attached to the driving shaft D and which is provided with a series of grooves *d* the number of which corresponds with the number of the arbors C and pulleys I are attached to the upper ends of the latter, corresponding in position to the position of the different grooves *d* in the driving wheel H so that the belt from one of these pulleys does not interfere with those of the others.

The wheel H is rotated by a handle J which is fastened to its upper face but power may be applied to it in any convenient manner, and for larger machines I would prefer to interpose a multiplying gear between the handle and the wheel H so as to obtain the requisite speed of the beaters without being obliged to move the hand any quicker than convenient. This gear is unnecessary of course when the machine is driven by steam power.

The operation is as follows: The vessels with the substances to be mixed or beaten are placed under the fingered beaters and so that these beaters extend down into the substances about half way or more, and a quick rotary motion is given to the same by means of the driving wheel H. By this motion and by the action of the substance in the vessels the fingers F spread out and a large quantity of the substance is agitated by the same at once, so that it takes but a very short time to reduce a quantity of eggs to froth or to mix a certain quantity of eggs with sugar, and as the fingers are flexible they diverge by being rotated with the disks and they adapt themselves to the shape of the vessel so that they actually sweep through every nook and corner of the vessel and that no portion of the substance in the same is left without being agitated by the action of the beaters. These fingers may however be constructed of some rigid substance, such as wood, and hung loosely in the disks so that they diverge when rotated and that they sweep through the entire mass of the liquid contained in the vessel.

What I claim as new and desire to secure by Letters Patent is—

1. The within described beaters C' arranged with diverging fingers F which are attached to disks E to operate substantially as and for the purpose set forth.

2. The arrangement of a series of beaters C' constructed as herein described on rotary shafts C so that the several beaters can be operated substantially as and for the purpose specified.

J. L. NICOLAI.

Witnesses:
JAMES GALLAGHER,
PHILIP FLAG.